(12) United States Patent
Cheng

(10) Patent No.: US 10,655,373 B2
(45) Date of Patent: May 19, 2020

(54) ROTATING PART HINGE AND MOBILE TERMINAL

(71) Applicant: Hangzhou Amphenol Phoenix Telecom Parts Co., Ltd., Zhejiang (CN)

(72) Inventor: Guanlun Cheng, Zhejiang (CN)

(73) Assignee: HANGZHOU AMPHENOL PHOENIX TELECOM PARTS CO., LTD., Zhejiang (CN)

(*) Notice: Subject to any disclaimer, the term of this patent is extended or adjusted under 35 U.S.C. 154(b) by 0 days.

(21) Appl. No.: 16/337,284

(22) PCT Filed: Sep. 25, 2017

(86) PCT No.: PCT/CN2017/103231
§ 371 (c)(1),
(2) Date: Mar. 27, 2019

(87) PCT Pub. No.: WO2018/059357
PCT Pub. Date: Apr. 5, 2018

(65) Prior Publication Data
US 2020/0011101 A1    Jan. 9, 2020

(30) Foreign Application Priority Data

Sep. 30, 2016  (CN) ........................... 2016 1 0871836
Sep. 30, 2016  (CN) ...................... 2016 2 1098921 U

(51) Int. Cl.
*E05D 11/10*  (2006.01)
*E05D 3/02*  (2006.01)
(Continued)

(52) U.S. Cl.
CPC ............... *E05D 3/02* (2013.01); *F16C 11/10* (2013.01); *E05Y 2201/422* (2013.01);
(Continued)

(58) Field of Classification Search
CPC ............ Y10T 16/5387; Y10T 16/5403; Y10T 16/54035; Y10T 16/540225; G06F 1/1681;
(Continued)

(56) References Cited

U.S. PATENT DOCUMENTS 6,886,221 B2 * 5/2005 Minami .............. H04M 1/0216
16/303
7,168,134 B2 * 1/2007 Minami ................ G06F 1/1616
16/303
(Continued)

FOREIGN PATENT DOCUMENTS

CN      201507544 U    6/2010
CN      204704254 U   10/2015
(Continued)

*Primary Examiner* — Chuck Y Mah
(74) *Attorney, Agent, or Firm* — Muncy, Geissler, Olds & Lowe, P.C.

(57) ABSTRACT

Provided is a hinge for a rotating part, comprising a first cam (1), a second cam (1), a fixed cam (2), a slide cam (4) and a spring (6). A mobile terminal to which the hinge is applied is also provided. The hinge structure is simple and easy to assemble, and a third rotating body can be connected besides two relatively rotatable bodies. A second rotating body and the third rotating body can be independently rotated and linked as required according to a designed rotating program, and a self-locking of the hinge can be realized. The hinge is applicable for connection of various rotors having three rotating bodies, and is especially applicable for a connecting bracket, a keyboard and a screen in a mobile terminal, and is convenient for opening and closing, providing stable support when the mobile terminal is in an open working angle range.

10 Claims, 9 Drawing Sheets

(51) Int. Cl.
*F16C 11/10* (2006.01)
*F16C 11/12* (2006.01)

(52) U.S. Cl.
CPC ... *E05Y 2201/638* (2013.01); *E05Y 2900/606* (2013.01); *F16C 11/12* (2013.01)

(58) Field of Classification Search
CPC ... G06F 1/1616; G06F 1/1618; H05K 5/0226; H04M 1/0216; E05Y 2900/606; E05Y 2201/422; E05Y 2201/638; E05D 11/087; E05D 11/08; E05D 11/082; E05D 11/084; E05D 11/085; E05D 3/02; F16C 11/00; F16C 11/12
See application file for complete search history.

(56) References Cited

U.S. PATENT DOCUMENTS

| | | | | |
|---|---|---|---|---|
| 7,334,296 B2* | 2/2008 | Park | ................... | H04M 1/0216 16/303 |
| 7,418,279 B2* | 8/2008 | Takagi | ................ | H04M 1/0216 16/371 |
| 2005/0128719 A1* | 6/2005 | Yamaguchi | ......... | H04M 1/0216 361/755 |
| 2006/0002068 A1 | 1/2006 | Kim | | |
| 2006/0005353 A1* | 1/2006 | Kubota | ................ | H04M 1/0216 16/221 |
| 2009/0280874 A1* | 11/2009 | Kosugi | ............... | H04M 1/0216 455/575.3 |
| 2010/0024165 A1* | 2/2010 | Kosugi | ............... | H04M 1/0216 16/303 |
| 2012/0272481 A1* | 11/2012 | Ahn | ................... | H04M 1/0216 16/325 |

FOREIGN PATENT DOCUMENTS

| | | |
|---|---|---|
| CN | 106438672 A | 2/2017 |
| CN | 206206389 U | 5/2017 |
| JP | 2014519580 A | 8/2014 |

* cited by examiner

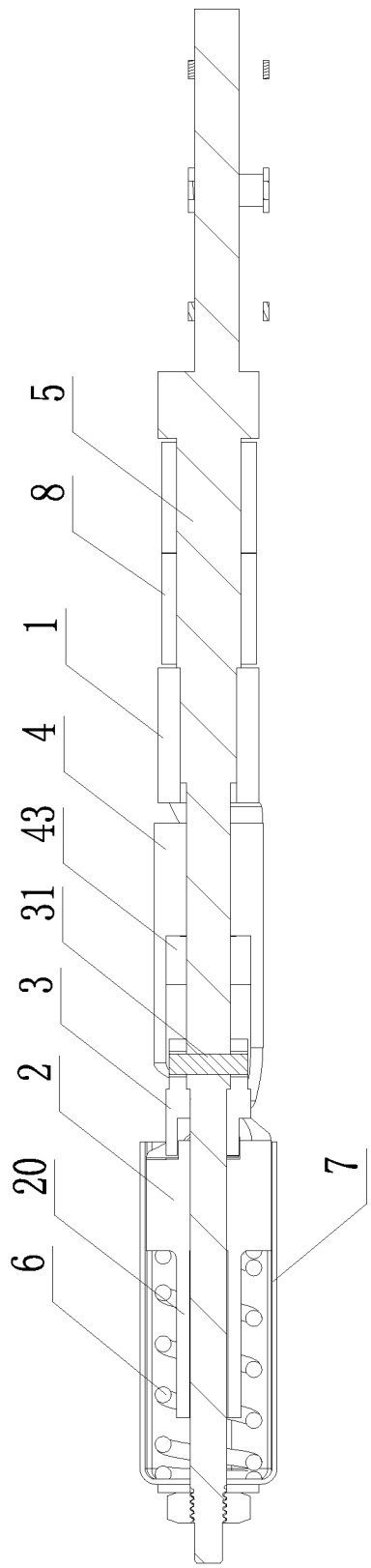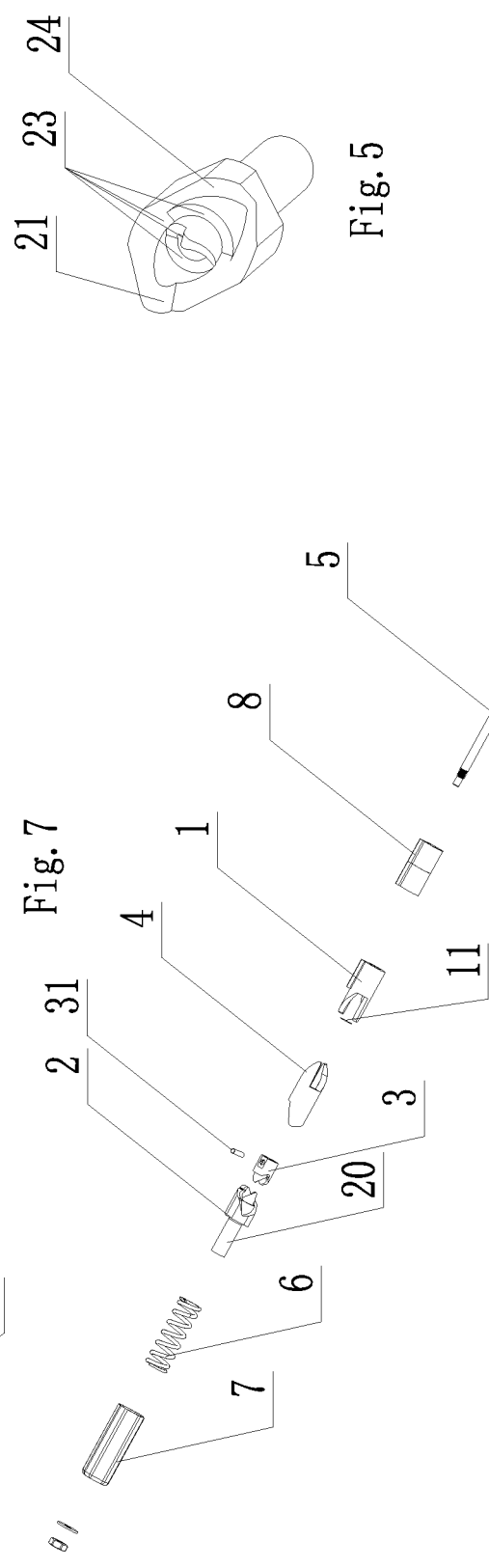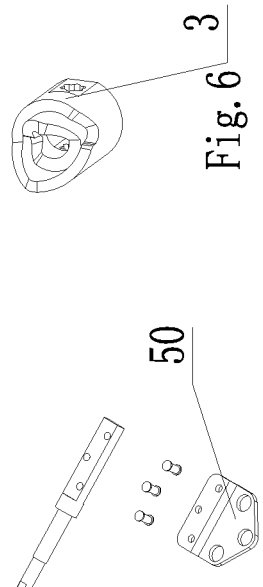

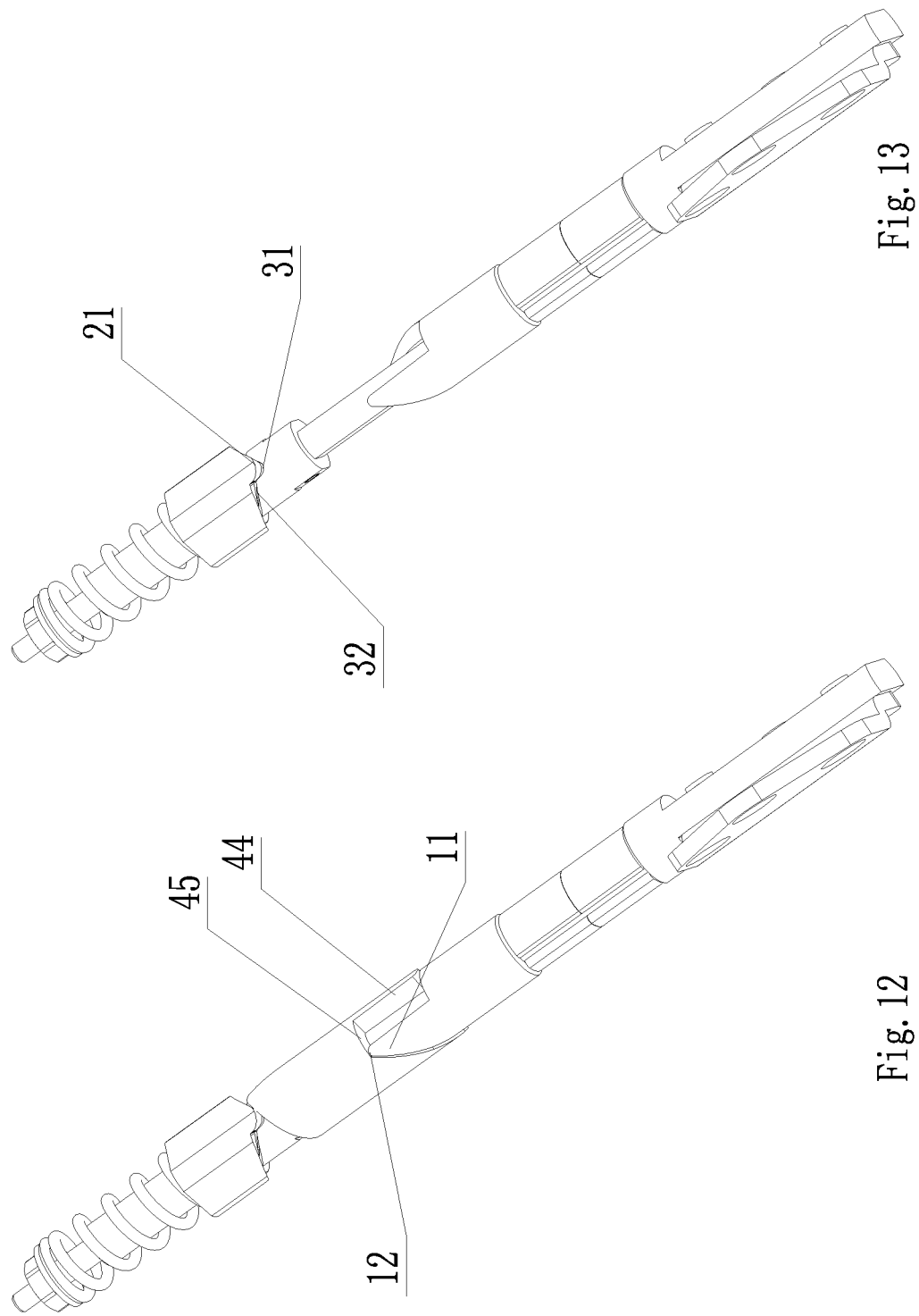

ROTATING PART HINGE AND MOBILE TERMINAL

TECHNICAL FIELD

The present utility model relates to a mobile terminal and a hinge. The mobile terminal may be an electronic product such as a notebook computer, a pad, a mobile phone, or a game machine, etc.

BACKGROUND

At present, many portable electronic products such as notebook computers and tablet computers are equipped with brackets to support the stability, and more requirements are proposed for the motion mode of brackets.

SUMMARY

It is an object of the present utility model aims to provide a hinge for a rotating part that can be connected in a mobile terminal, so as to provide independent motion or linkage functions of a plurality of rotating bodies. To achieve this object, the present utility model adopts the following technical solutions:

A hinge for a rotating part, comprising a rotating shaft, further comprising:

a first cam, connected to a first rotating bracket for synchronous rotation, and the first cam being axially positioned outside the rotating shaft and being rotated around the rotating shaft;

a second cam, connected to a second rotating bracket for synchronous rotation, and the second cam being sleeved outside the rotating shaft and being rotated around the rotating shaft and being slid along the rotating shaft;

a fixed cam, fixed on the rotating shaft and unable to be displaced, being rotated with the rotating shaft;

a slide cam, sleeved outside the rotating shaft, being rotated around the rotating shaft and being slid along the rotating shaft;

The first cam and the second cam are respectively disposed outside the two ends of the slide cam and cooperate with the slide cam, the two ends of the slide cam are respectively provided with a first cam structure that cooperates with the first cam and a second cam structure that cooperates with the second cam;

The second cam is provided with a third cam structure that cooperates with the fixed cam and a fourth cam structure that cooperates with the slide cam and the second cam structure;

The hinge is further provided with a spring for applying a thrust to the second cam in the direction toward the slide cam;

The second rotating bracket provides a locking force for the hinge relying on the thrust applied to the second cam by the spring and a cooperation of the third cam structure and the fixed cam.

On the basis of the foregoing technical solutions, the present utility model can also adopt the following further technical solutions or use a combination of these technical solutions.

The side of the slide cam adjacent to the first cam is slidably coupled to the rotating shaft, and the side of the slide cam adjacent to the second cam has a space for accommodating the fixed cam, and when the hinge is in a closed state, the fixed cam is in the space.

A torque mechanism is disposed between the first rotating bracket and the rotating shaft to provide a function that the first rotating bracket stops rotating at any time and maintains a turning angle at any time.

The first rotating bracket is connected with a friction sleeve sleeved outside the rotating shaft, and the friction sleeve cooperates with the rotating shaft to provide a function that the first rotating bracket stops rotating at any time and maintains a turning angle at any time.

The second cam is provided with an extension sleeve, and the extension sleeve is slidably and rotationally engaged with the rotating shaft, and the spring is sleeved outside the extension sleeve.

The hinge is provided with a casing, the spring and the second cam are located in the casing, the casing and the second rotating bracket are fixedly connected, and the second cam and the casing are slidably connected but cannot rotate relative to each other.

The third cam structure and the fourth cam structure of the second cam are respectively located on end faces of concentric rings having different radii on the second cam, and the third cam structure is on the end face of the outer ring of the second cam, the fourth cam structure is on the end face of the ring on the inner side of the outer ring. The cooperation of the second cam with the slide cam and the cooperation of the second cam with the fixed cam are switched at different stages of opening and closing of the hinge.

The hinge has a critical angle, a maximum opening angle of the second rotating bracket, and a maximum opening angle of the first rotating bracket; the first critical angle is smaller than the maximum opening angle of the first rotating bracket, and the maximum opening angle of the first rotating bracket is smaller than the maximum opening angle of the second rotating bracket;

During the process when the hinge is in a closed state to the time when the first rotating bracket rotates to the critical angle, the second rotating bracket is driven by the rotation of the first rotating bracket and thereby drives the second cam to rotate, and at the same time, the second cam climbs along the fixed cam, so that the second cam slides away from the first cam to compress the spring when rotating;

After rotating to a critical angle during the opening process, the second rotating bracket is automatically opened to a maximum opening angle by the thrust of the spring and the cooperation of the third cam structure and the fixed cam;

After the critical angle, there is a slot and an insertion portion that are interposed between each other and allow the first cam to rotate by a certain angle between the first cam and the first cam structure, and the certain angle is the difference between the maximum opening angle of first rotating bracket and the critical angle; when the first rotating bracket is opened to exceed the critical angle and continue to rotate, the slide cam slides towards the first cam driven by the second cam, and the insertion portion falls into the slot;

During the rotation of the first rotating bracket from the critical angle to the closing, the first cam drives the slide cam to slide towards the second cam during the rotation, and with the cooperation of the fourth cam structure and the second cam structure, and the cooperation of the third cam structure and the fixed cam, the second cam rotates to the critical angle towards the closing direction at a speed faster than the first rotating bracket, and slides away from the first cam to compress the spring;

After rotating to the a critical angle during the closing process, the second rotating bracket is automatically rotated to the closing and push the second cam to slide towards the first cam by the thrust of spring and the cooperation between the third cam structure and the fixed cam or between the fourth cam structure and the second cam structure.

Corresponding to the maximum rotation angle of the second rotating bracket, the cooperation of the third cam structure and the fixed cam is a cooperation of the concave slot and the bump.

Another object of the present utility model is to provide a mobile terminal to which the hinge is applied. To achieve the object, the present utility model adopts the following technical solution:

A mobile terminal, comprising a first body and a second body that are rotatably coupled, wherein the mobile terminal is further provided with any one of the above hinges, the rotating shaft is connected to the first body, and the second body is connected to the first rotating bracket.

According to the technical solutions of the present utility model, the hinge for a rotating part provided herein is simple in structure and easy to assemble, and a third rotating body can be connected besides two relatively rotatable bodies. A second rotating body and a third rotating body can be independently rotated and linked as required according to a designed rotating program, and a self-locking of the hinge can be realized. The hinge is applicable for connection of various rotors having three rotating bodies, and is especially applicable for a connecting bracket, a keyboard and a screen in a mobile terminal, and is convenient for opening and closing, providing stable support when the mobile terminal is in an open working angle range.

BRIEF DESCRIPTION OF DRAWINGS

FIG. 4 is an exploded view of an embodiment of the hinge provided herein.

FIG. 5 is a schematic view of a second cam.

FIG. 6 is a schematic view of a fixed cam.

FIG. 7 is a cross-sectional view of the hinge provided herein when both the first rotating bracket and the second rotating bracket are at the maximum opening angle.

FIG. 9 is a schematic view of the hinge after the slide cam is hidden in the state shown in

FIG. 8.

FIG. 12 is a schematic view of the hinge embodiment provided herein when the first rotating bracket is opened to the maximum opening angle and the first bracket is rotated to the critical angle, and the first rotating bracket and the second rotating bracket are hidden.

FIG. 13 is a schematic view of the hinge after the slide cam is hidden in the state shown in FIG. 12.

DETAILED DESCRIPTION

Figure 1:
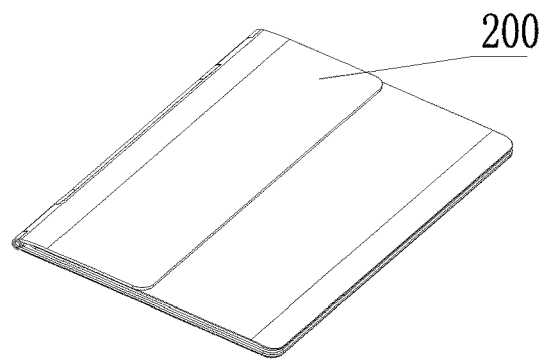
FIG. 1 is a schematic view showing the hinge embodiment provided herein in a closed state when applied to a mobile terminal.
Figure 2:
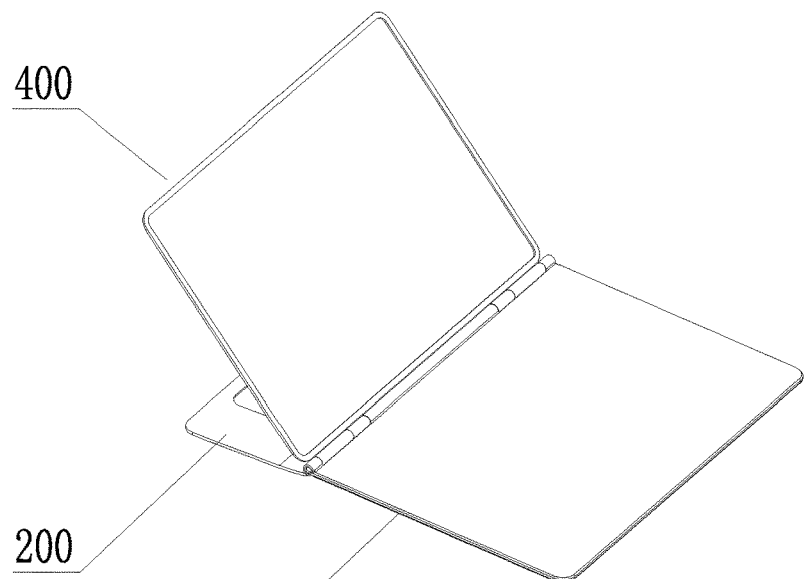
FIG. 2 is a schematic view showing the hinge embodiment provided herein when the second rotating bracket and the first rotating bracket are both at their maximum opening angles when applied to the mobile terminal.
Figure 3:
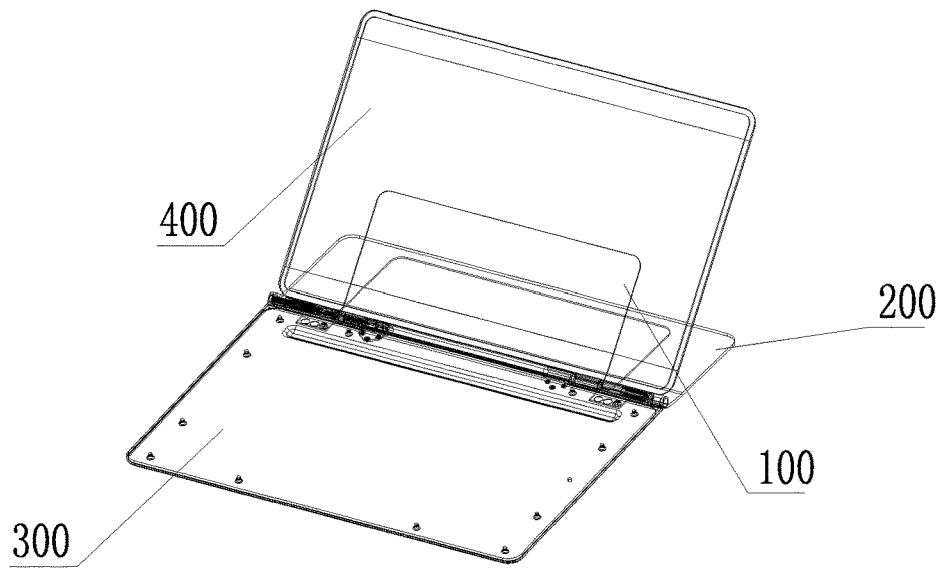
FIG. 3 is a schematic view showing the second rotating bracket and the first rotating bracket transparently in the state shown in FIG. 2.
Figure 8:
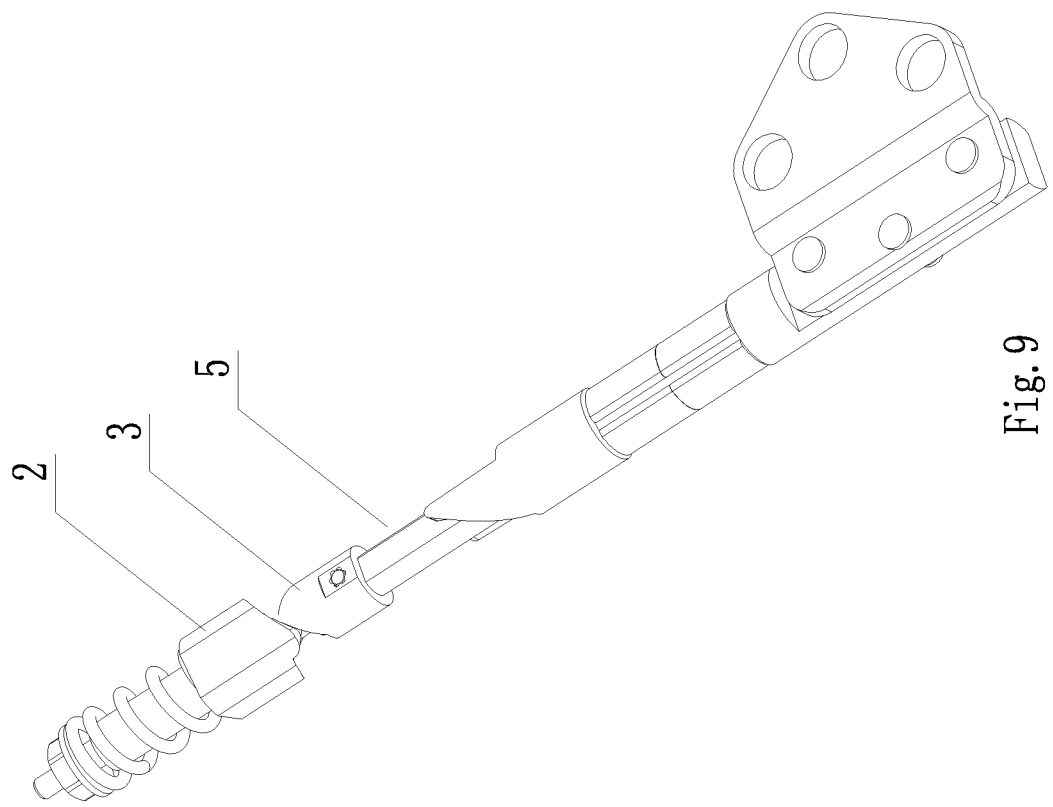
FIG. 8 is a schematic view showing the hinge embodiment provided herein in a closed state with the first rotating bracket and the second rotating bracket hidden.
Figure 9:
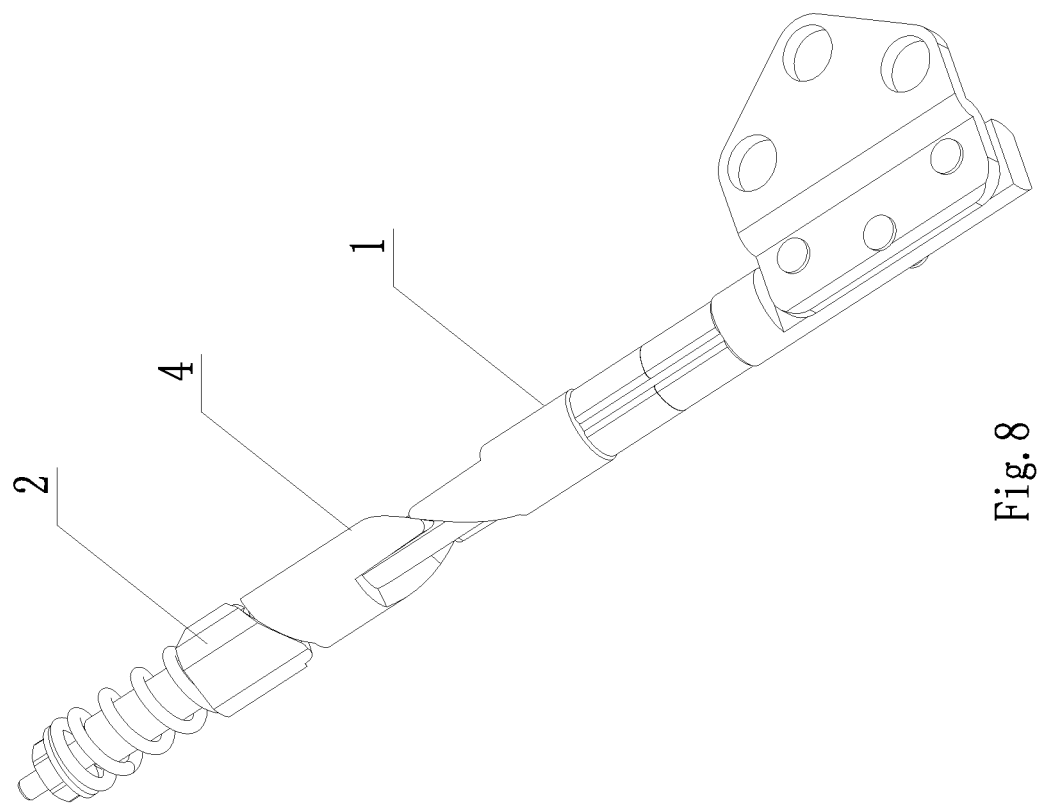
Figure 11:
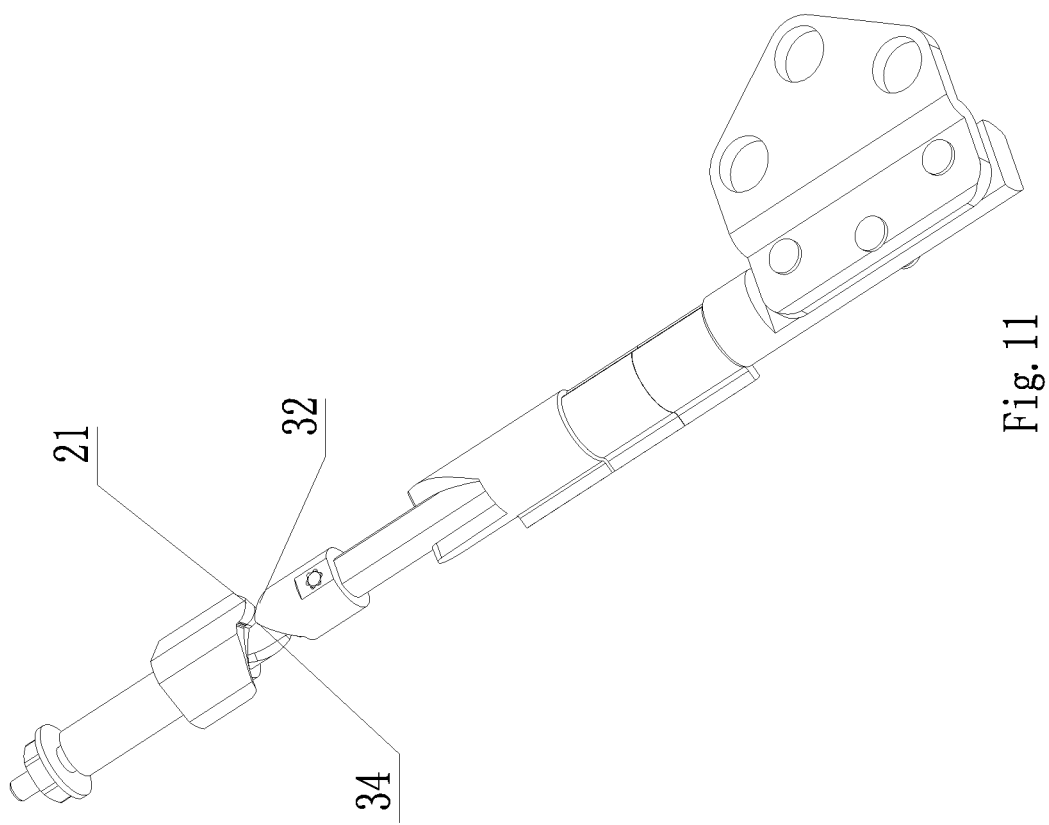
FIG. 11 is a schematic view of the hinge after the slide cam is hidden in the state shown in FIG. 10.
Figure 10:
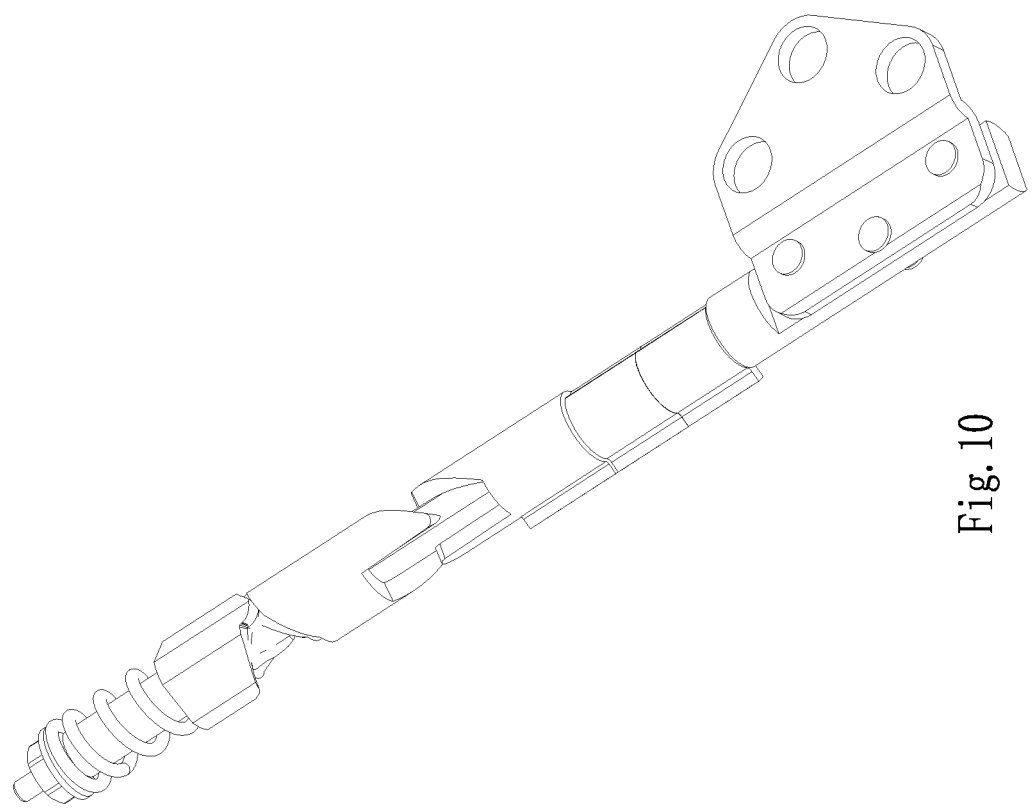
FIG. 10 is a schematic view of the hinge embodiment provided herein after the first bracket and the second rotating bracket are hidden when the first bracket is rotated to a critical angle.
Figure 14:
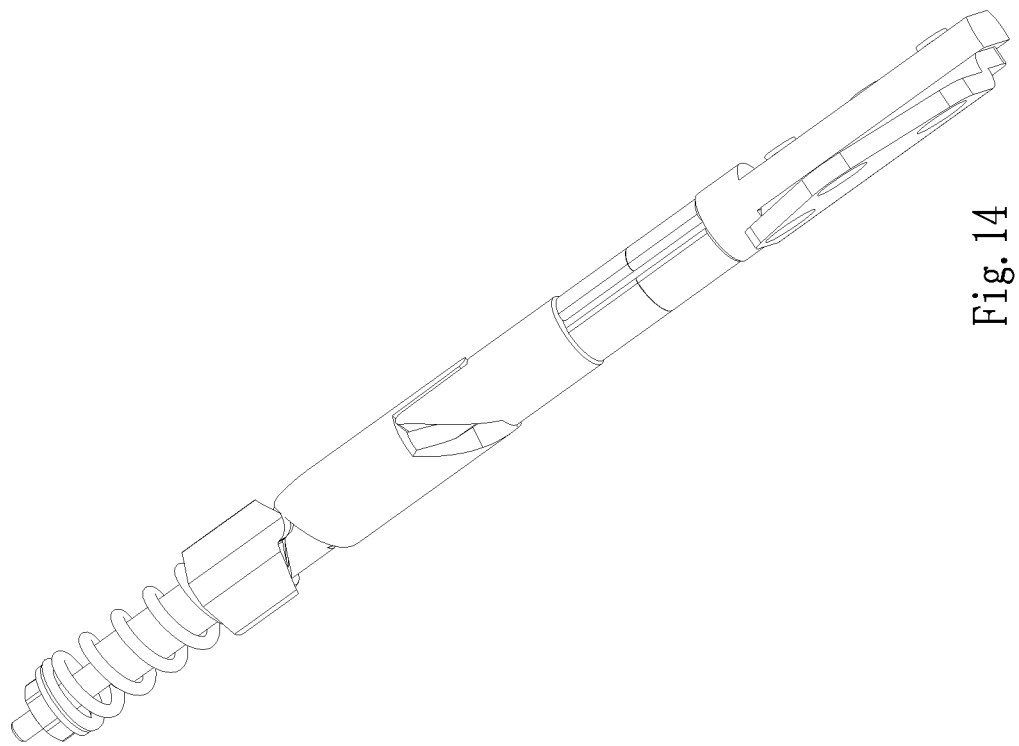
FIG. 14 is a schematic view of the hinge embodiment provided herein, after the first rotating bracket is rotated to the maximum opening angle, and the first rotating bracket and the second rotating bracket are hidden, in the state shown in FIG. 12.
Figure 15:
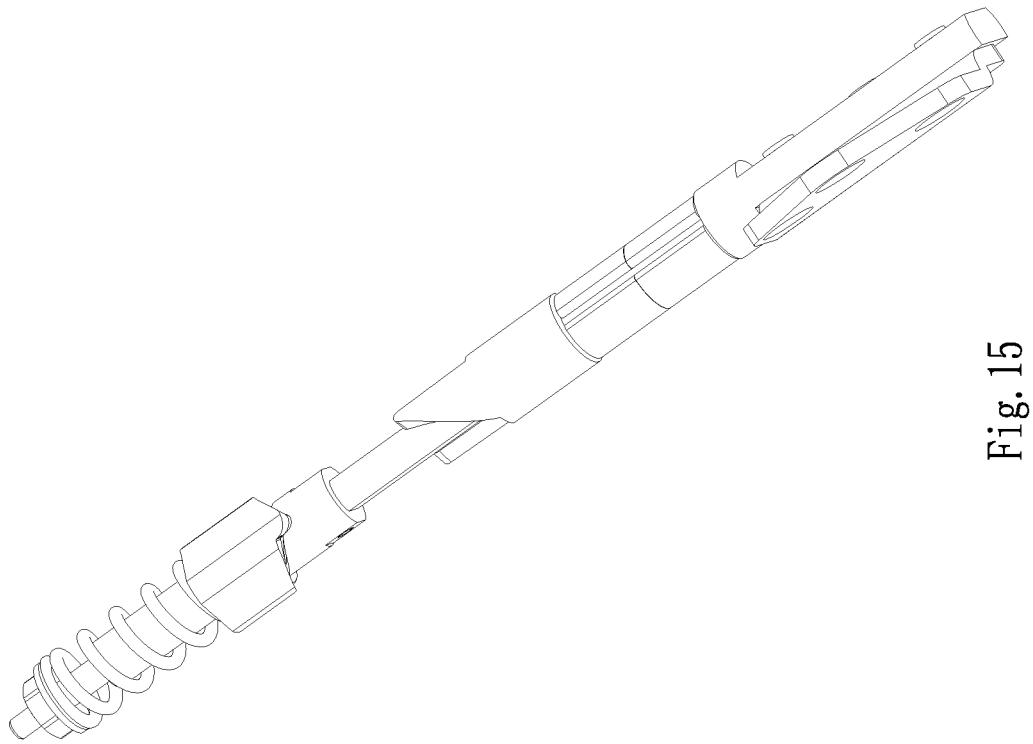
FIG. 15 is a schematic view of the hinge after the slide cam is hidden in the state shown in FIG. 14.
Figure 16:
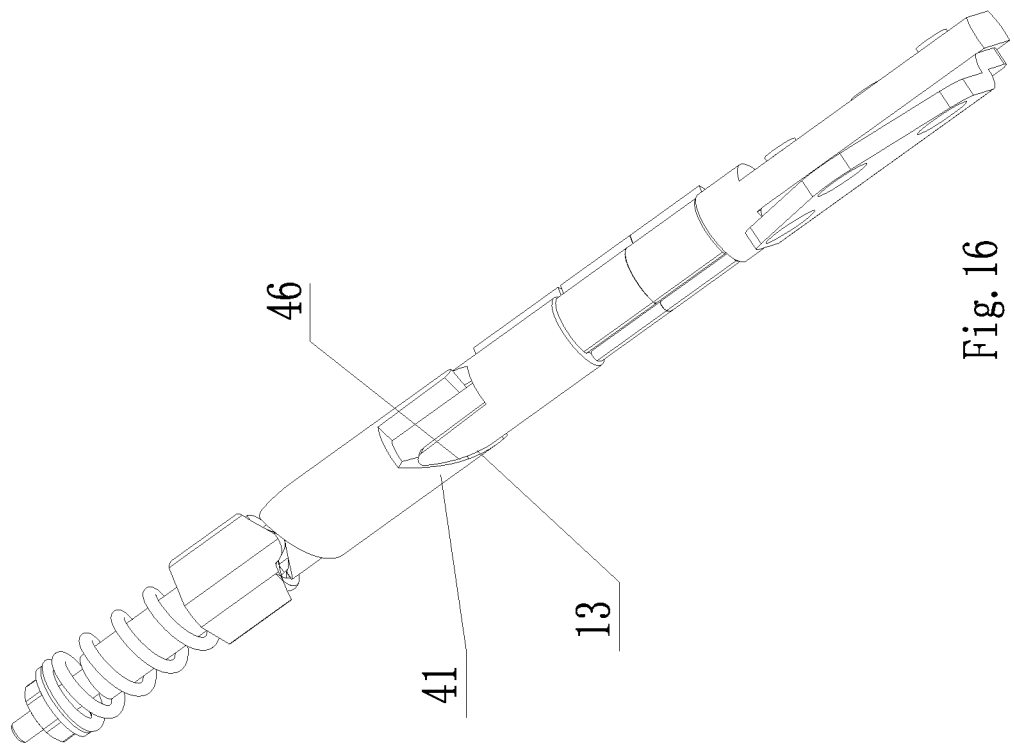
FIG. 16 is a schematic view of the hinge embodiment provided herein, in which the first rotating bracket is turned back to just less than the critical angle, and the first rotating bracket and the second rotating bracket are hidden.
Figure 17:
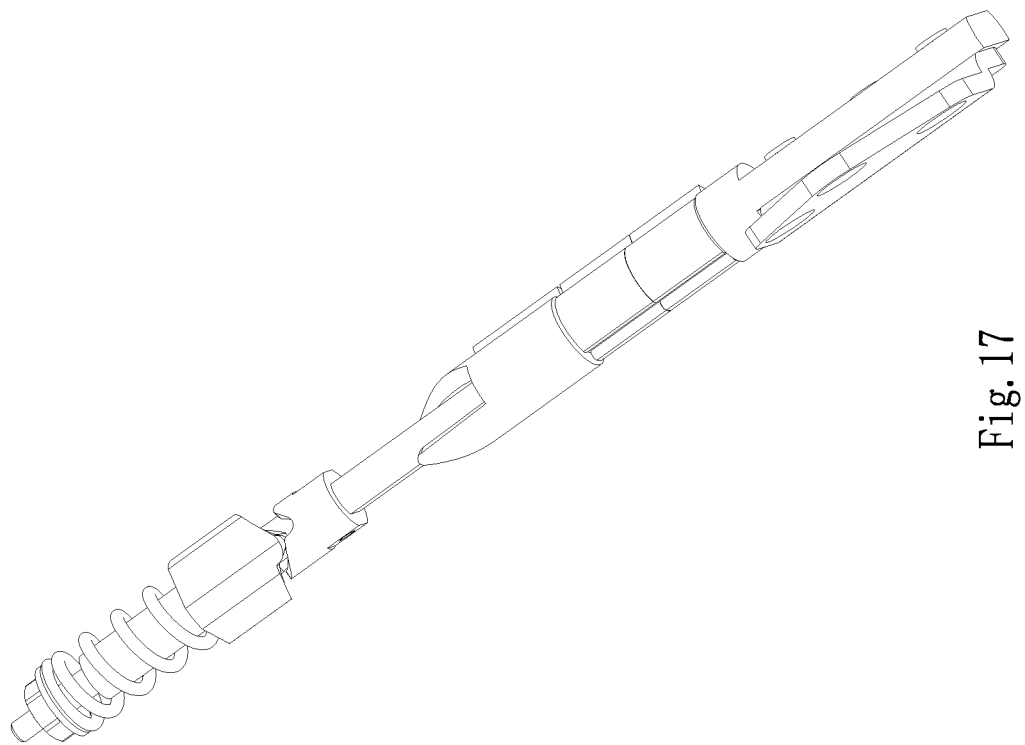
FIG. 17 is a schematic view of the hinge after the slide cam is hidden in the state shown in FIG. 16.
Figure 19:
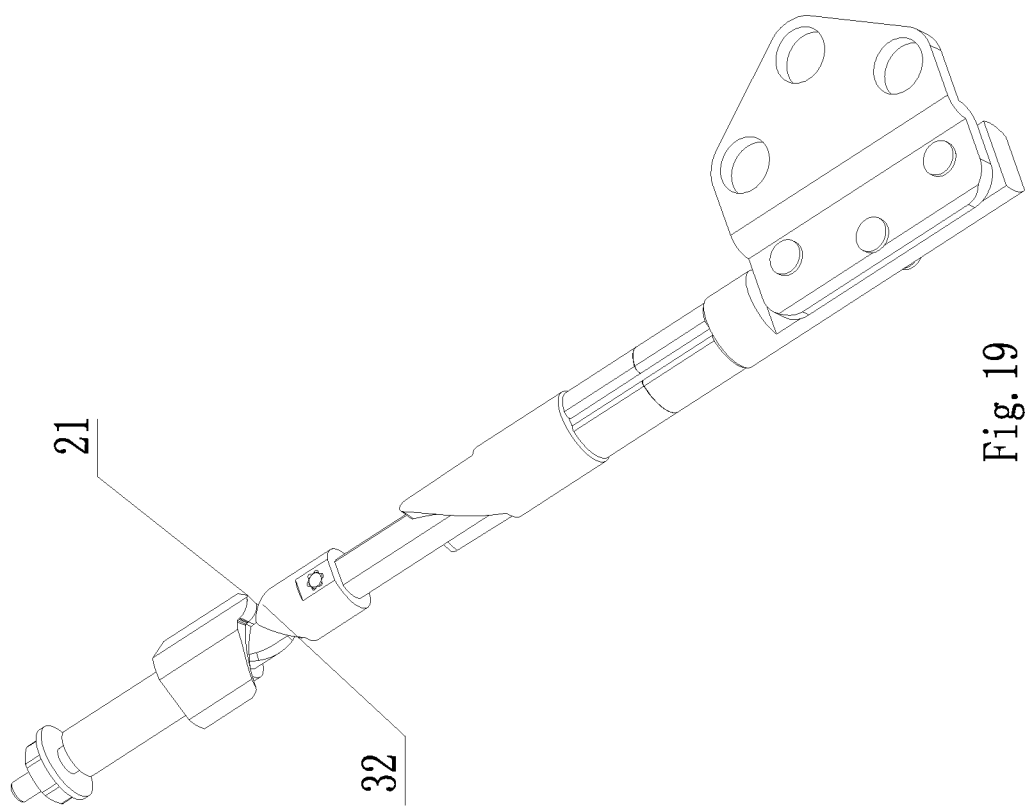
FIG. 19 is a schematic view of the hinge after the slide cam is hidden in the state shown in FIG. 18.
Figure 18:
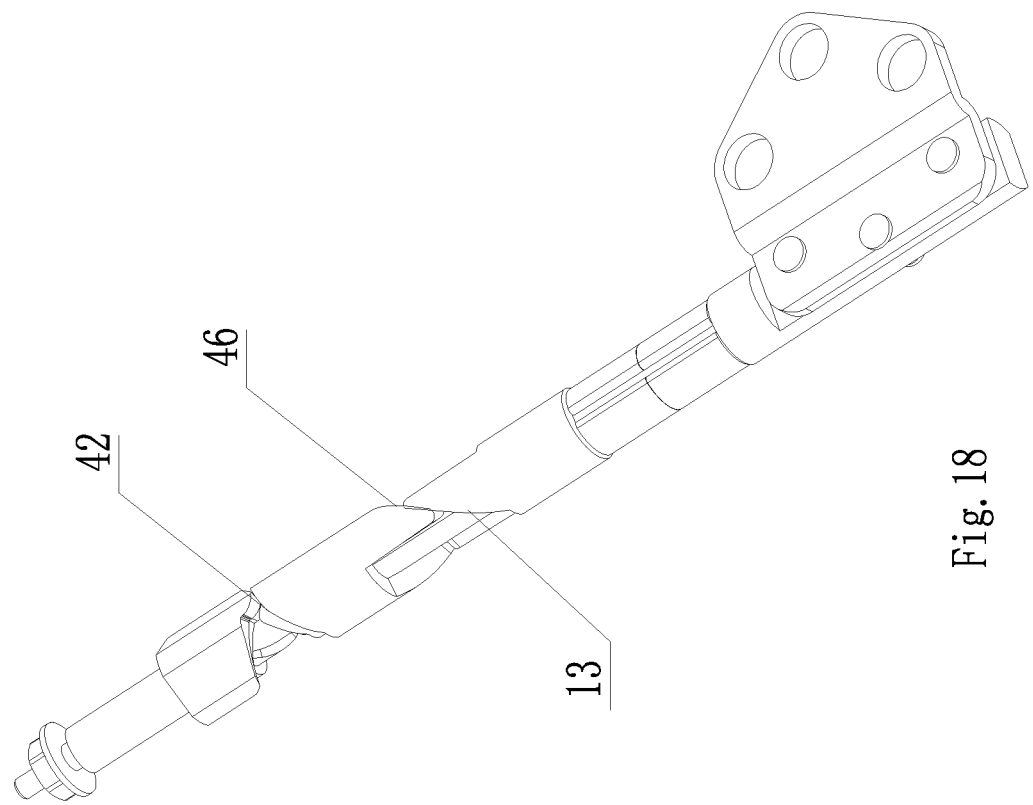
FIG. 18 is a schematic view of the hinge embodiment provided herein in the closing process when the first rotating bracket is turned back to close, the first rotating bracket and the second rotating bracket are hidden. At this time, the second rotating bracket is also turned back to near critical angle.
Figure 21:
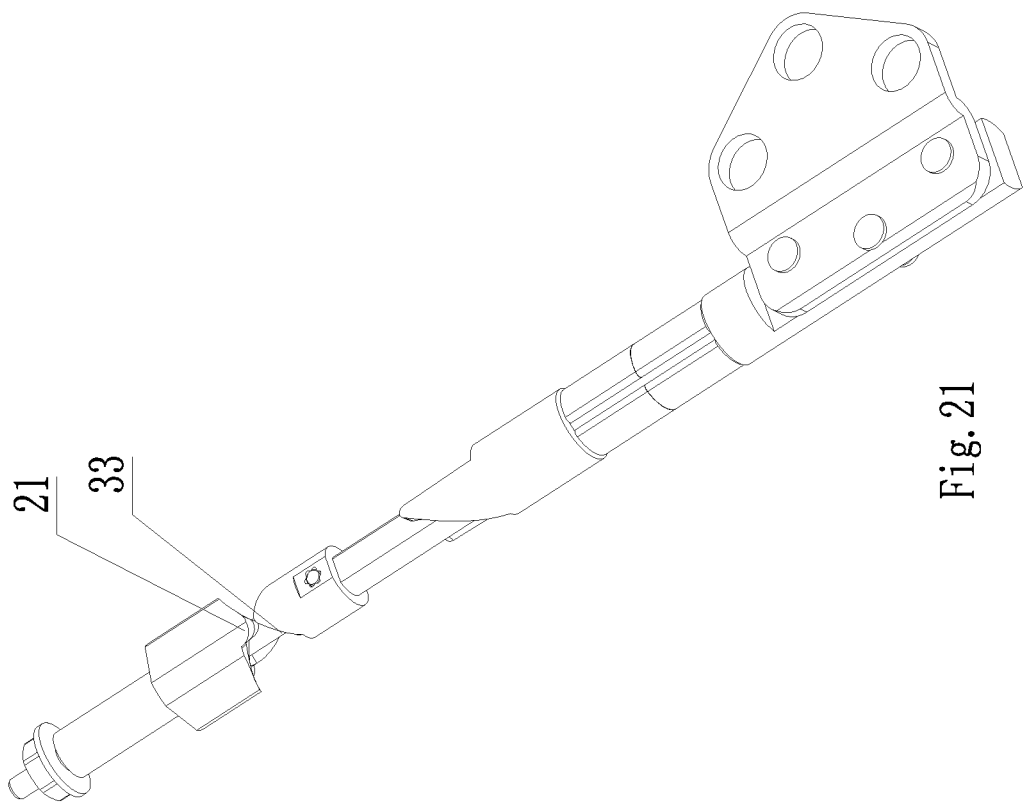
FIG. 21 is a schematic view of the hinge after the slide cam is hidden in the state shown in FIG. 20.
Figure 20:
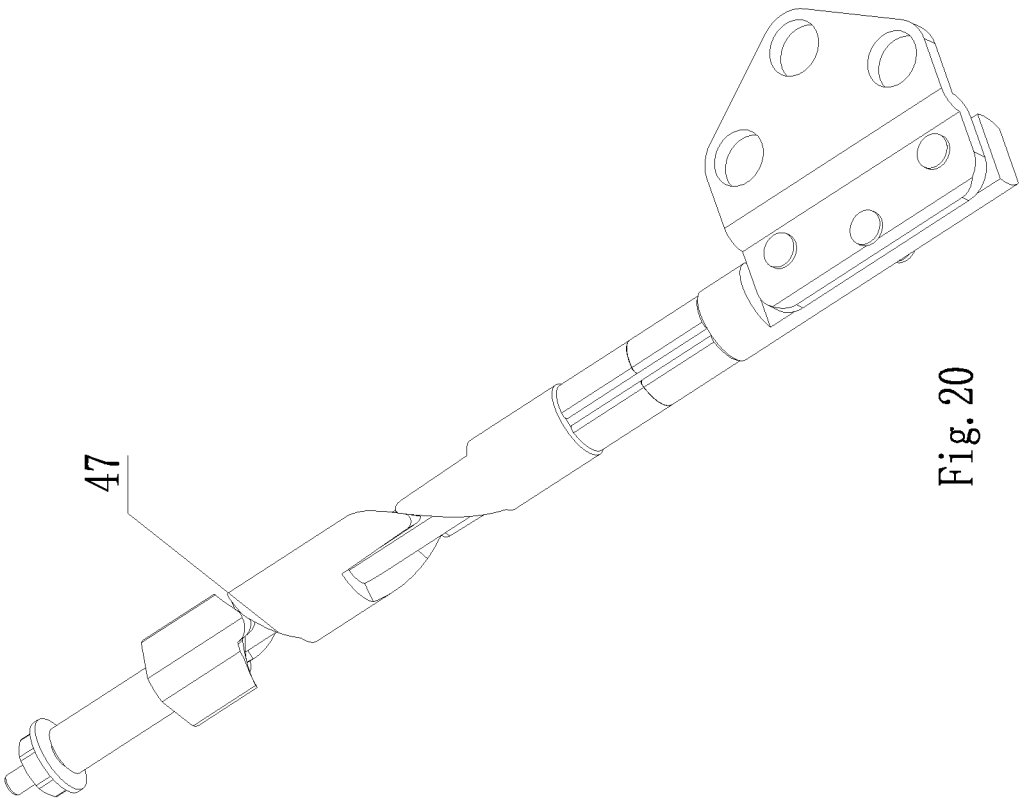
FIG. 20 is a schematic view of the hinge embodiment provided herein in the closing process when the first rotating bracket is turned back to close, the first rotating bracket and the second rotating bracket are hidden. At this time, the second rotating bracket is turned back to just more than the critical angle.

Referring to the figures, a hinge for a rotating part provided herein, comprising a rotating shaft 5, and:

a first cam 1, connected to a first rotating bracket 100 for synchronous rotation, and the first cam 1 being axially positioned outside the rotating shaft 5 and being rotated around the rotating shaft; the axial positioning can utilize a step on the rotating shaft and a limit connecting piece 11 that can be assembled with the rotating shaft;

a second cam 2, connected to a second rotating bracket 200 for synchronous rotation, and the second cam 2 being sleeved outside the rotating shaft and being rotated around the rotating shaft 5 and being slid along the rotating shaft 5; and they can be in clearance fit with round holes;

a fixed cam 3, fixed on the rotating shaft 5 and unable to be displaced, being rotated with the rotating shaft 5 together, which can be connected to rotating shaft by a pin 31 or be in an interference fit connection or other means;

a slide cam 4, sleeved outside the rotating shaft 5, being rotated around the rotating shaft 5 and being slid along the rotating shaft; the slide cam 4 can be slidably connected to the rotating shaft 5 through a flat hole;

The first cam 1 and the second cam 2 are respectively disposed outside the two ends of the slide cam 4 and cooperate with the slide cam 4, the two ends of the slide cam 4 are respectively provided with a first cam structure 41 that cooperates with the first cam 1 and a second cam structure 42 that cooperates with the second cam 2;

The second cam 2 is provided with a third cam structure 23 that cooperates with the fixed cam 3 and a fourth cam structure 24 that cooperates with the slide cam 4 and the second cam structure 42;

The hinge is further provided with a spring 6 for applying a thrust to the second cam 2 in the direction toward the slide cam 4;

When the hinge is in the closed state, relying on the thrust of the spring 6 to the second cam 2 and the cooperation of the third cam structure 23 and the fixed cam 3, the second cam 2 has a tendency to rotate toward the closing direction of the second rotating bracket 200, and the second rotating bracket 200 has a downward pressure on the first rotating bracket 100 to provide a locking force for the hinge.

The hinge is provided with a casing 7, the spring 6 and the second cam 2 are in the casing, and the casing 7 and the second rotating bracket 200 are fixedly connected, and the second cam 2 and the casing 7 are slidably connected but cannot be relatively rotated, so that the second cam 2 is connected to the second rotating bracket 200 by the casing 7, and the second cam 2 can slide relative to the casing 7. One end of the rotating shaft 5 passes through the casing 7 and is supported on the casing 7.

The side of the slide cam 4 adjacent to the first cam 1 is slidably coupled to the rotating shaft 5, and the side of the slide cam 4 adjacent to the second cam 2 has a space 43 for accommodating the fixed cam 3, and when the hinge is in a closed state, the fixed cam 3 is in the space 43.

A torque mechanism is disposed between the first rotating bracket 100 and the rotating shaft 5, the torque mechanism may adopt a friction mechanism comprising a friction sleeve 8, the first rotating bracket 100 is connected to the friction sleeve 8 that is sleeved outside of the rotating shaft 5, and the friction sleeve 8 cooperates with the rotating shaft 5, to provide a function that the first rotating bracket 100 stops rotating at any time and maintains a turning angle at any time.

The second cam 2 is provided with an extension sleeve 20, and the extension sleeve 20 is slidably and rotationally engaged with the rotating shaft 5, to increase the stability of the second cam 2, and the spring 6 is sleeved outside the extension sleeve.

The third cam structure 23 the fourth cam structure 24 of the second cam 2 are respectively located on end faces of concentric rings having different radii on the second cam, and the third cam structure 23 is on the end face of the outer ring of the second cam, the fourth cam structure 24 is on the end face of the ring on the inner side of the outer ring. The cooperation of the second cam 2 with the slide cam 4 and the cooperation of the second cam 2 with the fixed cam 3 are switched at different stages of opening and closing of the hinge. At a certain stage, the third cam structure 23 cooperates with the fixed cam 3 while the slide cam 4 does not work for the second cam 2; at a certain stage, the fixed cam 3 and the slide cam 4 work together, and at this stage, the third cam structure 23 cooperates with the fixed cam 3, and the second cam structure 2 cooperates with the fourth cam structure. If necessary, the second cam structure 2 cooperates with the fourth cam structure while the fixed cam 3 does not work, to achieve the rotating of the second rotating bracket 200 according to the designed procedure.

The cam surfaces of the first cam 1, second cam 2, fixed cam 3 and slide cam 4 can be designed according to different target programs, for example, it can be realized that the second rotating bracket 200 has both the functions of synchronous opening with the first rotating bracket 100, and the second rotating bracket 200 is automatically opened to the optimal supporting angle when the first rotating bracket 100 is opened to a certain angle (critical angle), and the first rotating bracket 100 can freely rotate within a certain angle range without affecting the second rotating bracket 200 after the second rotating bracket 200 is automatically opened to the optimal supporting angle. When the first rotating bracket 100 is rotated to a critical angle, the second rotating bracket 200 can automatically rotate and recover, and bounce back at the final stage to provide the closing locking force of the hinge. In this kind of cam cooperation, the hinge has a critical angle, a maximum opening angle of the second rotating bracket 200, and a maximum opening angle of the first rotating bracket 100; the first critical angle is smaller than the maximum opening angle of the first rotating bracket, and the maximum opening angle of the first rotating bracket is smaller than the maximum opening angle of the second rotating bracket.

The critical angle may be an acute angle between 45° and 90°, corresponding to a minimum commonly used angle (for example, a minimum commonly used angle relative to the keyboard when the screen is opened, for example, 75°), the maximum opening angle of the first rotating bracket 100 may be at an obtuse angle; corresponding to the maximum commonly used angle (for example, a maximum commonly used angle of the screen when the screen is opened relative to the keyboard, for example, 135°), the maximum opening angle of the second rotating bracket 200 is the optimal support angle, for example, slightly higher than 180°.

During the process when the hinge is in a closed state to the time when the first rotating bracket rotates to the critical angle, the second rotating bracket 200 is driven by the rotation of the first rotating bracket 100 and thereby drives the second cam 2 to rotate, and at the same time, the second cam 2 climbs along the fixed cam 3, so that the second cam slides away from the first cam to compress the spring 6 when rotating; During this process, the slide cam 4 has no effect on the first cam 1 and the second cam 2; when the critical angle is reached, the bump 21 of the third cam structure 23 cooperates with the bump 34 of the fixed cam 3.

After rotating to a critical angle during the opening process, the second rotating bracket 200 is automatically opened to a maximum opening angle by the thrust of the spring 6 and the cooperation of the third cam structure 23 and the fixed cam 3; the maximum opening angle corresponds to the maximum rotation angle of the second rotating bracket 200, and the cooperation of cam is a cooperation between the bump 21 and the inclined surface 32, to guide the second cam 2 (second rotating bracket 200) to rotate, and at the same time, the second cam 2 is pushed by the spring 6 to slide toward the first cam 1 and drive the slide cam 4 to slide toward the first cam 1; at the maximum opening angle of second rotating bracket, the cooperation of the third cam structure 23 and the fixed cam 3 may be a cooperation of the concave slot 31 and the bump 21, to provide a support and locking function at the maximum angle.

After the critical angle, there is a slot 44 and an insertion portion 11 that are interposed between each other and allow the first cam 1 to rotate by a certain angle between the first cam 1 and the first cam structure 41, and the certain angle is the difference between the maximum opening angle of first rotating bracket and the critical angle. Within this range of angles of rotation, the first cam 1 and the first cam structure 41 are the cooperation between the top end 12 and the plane 45, without interaction between them, and the first cam does not push the slide cam to slide. When the first rotating bracket 100 is opened to exceed the critical angle and continue to rotate, the slide cam 4 slides towards the first cam 1 driven by the second cam 2, and the insertion portion 11 falls into the slot 44.

During the rotation of the first rotating bracket 100 from the critical angle to the closing, the first cam 1 drives the slide cam 4 to slide towards the second cam 2 during the rotation, and the cooperation of the first cam 1 and the first cam structure 41 may be a cooperation of the inclined surface 13 with the inclined surface 46; and with the cooperation of the fourth cam structure 24 and the second cam structure 42, and the cooperation of the third cam structure 23 and the fixed cam 3, the second cam 2 rotates to the critical angle towards the closing direction at a speed faster than the first rotating bracket 100, and slides away from the first cam 1 to compress the spring; the cooperation of the fourth cam structure 24 and the second cam structure 42 and cooperation of the third cam structure 23 and the fixed cam 3 may be the cooperation of the bump 21 with the inclined surface 32 and the inclined surface 42, and the height of the bump of the fourth cam structure 24 is the same as that of the third cam structure 23, that is, the bump 21.

After rotating to the a critical angle during the closing process, the second rotating bracket 200 is automatically rotated to the closing and push the second cam to slide towards the first cam by the thrust of spring 6 and the cooperation between the third cam structure 23 and the fixed cam 3 or between the fourth cam structure 24 and the second cam structure 42, at this time, the bump 21 cooperates with the inclined surface 33 or the inclined surface 47 to guide the rotation of the second cam 2 (second rotating bracket 200). The inclined surface 47 can play the role of leaving a space and can transmit a locking pressure to the first cam.

The utility model can be applied to various mobile terminals such as the rotating shaft of bracket of communication equipment, a tablet computer and a notebook computer, a two-in-one electric power, a PAD and an IPAD support frame rotating shaft, etc.

Taking the application in the PAD as an example, the mobile terminal comprises a first body 300 and a second body 400 that are rotatably coupled. The rotating shaft 5 is connected to the first body 300 via the fix, and the second body is connected to the first rotating bracket by a fixing plate 500, and the second body 400 is connected to the first rotating bracket 100. The first body is provided with a keyboard, and the second body 400 is a PAD equipped with a screen.

The above description is only particular embodiments of the present invention, but the structural features of the present invention are not limited thereto, and any changes or modifications made by those skilled in the art within the field of the present utility model should fall within the scope of protection of the present utility model.

What is claimed is:

1. A hinge for a rotating part, comprising a rotating shaft, further comprising: a first cam, connected to a first rotating bracket for synchronous rotation, and the first cam being axially positioned around the rotating shaft and being rotated around the rotating shaft; a second cam, connected to a second rotating bracket for synchronous rotation, and the second cam being sleeved around the rotating shaft and being rotated around the rotating shaft and being slid along the rotating shaft; a fixed cam, fixed on the rotating shaft and unable to be displaced, being rotated with the rotating shaft; a slide cam, sleeved around the rotating shaft, being rotated around the rotating shaft and being slid along the rotating shaft; the first cam and the second cam are respectively disposed at two opposite ends of the slide cam and cooperate with the slide cam, the two ends of the slide cam are respectively provided with a first cam structure that cooperates with the first cam and a second cam structure that cooperates with the second cam; the second cam is provided with a third cam structure that cooperates with the fixed cam and a fourth cam structure that cooperates with the slide cam and the second cam structure; The hinge is further provided with a spring for applying a thrust to the second cam in the direction toward the slide cam; The second rotating bracket provides a locking force for the hinge relying on the thrust applied to the second cam by the spring and a cooperation of the third cam structure and the fixed cam.

2. The hinge for a rotating part according to claim 1, wherein the side of the slide cam adjacent to the first cam is slidably coupled to the rotating shaft, and the side of the slide cam adjacent to the second cam has a space for accommodating the fixed cam, and when the hinge is in a closed state, the fixed cam is in the space.

3. The hinge for a rotating part according to claim 1, wherein a torque mechanism is disposed between the first rotating bracket and the rotating shaft to provide a function that the first rotating bracket stops rotating at any time and maintains a turning angle at any time.

4. The hinge for a rotating part according to claim 1, wherein the first rotating bracket is connected with a friction sleeve sleeved around the rotating shaft, and the friction sleeve cooperates with the rotating shaft to provide a function that the first rotating bracket stops rotating at any time and maintains a turning angle at any time.

5. The hinge for a rotating part according to claim 1, wherein the second cam is provided with an extension sleeve, and the extension sleeve is slidably and rotationally engaged with the rotating shaft, and the spring is sleeved around the extension sleeve.

6. The hinge for a rotating part according to claim 1, wherein the hinge is provided with a casing, the spring and the second cam are located in the casing, the casing and the second rotating bracket are fixedly connected, and the second cam and the casing are slidably connected but cannot rotate relative to each other.

7. The hinge for a rotating part according to claim 1, wherein the third cam structure and the fourth cam structure of the second cam are respectively located on end faces of concentric rings having different radii on the second cam, and the fourth cam structure is on the end face of the outer ring of the second cam, the third cam structure is on the end face of the ring on the inner side of the outer ring, the cooperation of the second cam with the slide cam and the cooperation of the second cam with the fixed cam are switched at different stages of opening and closing of the hinge.

8. The hinge for a rotating part according to claim 1, wherein the hinge has a critical angle, a maximum opening angle of the second rotating bracket, and a maximum opening angle of the first rotating bracket; the first critical angle is smaller than the maximum opening angle of the first rotating bracket, and the maximum opening angle of the first rotating bracket is smaller than the maximum opening angle of the second rotating bracket; during the process when the hinge is in a closed state to the time when the first rotating bracket rotates to the critical angle, the second rotating bracket is driven by the rotation of the first rotating bracket and thereby drives the second cam to rotate, and at the same time, the second cam climbs along the fixed cam, so that the second cam slides away from the first cam to compress the spring when rotating; After rotating to a critical angle during the opening process, the second rotating bracket is automatically opened to a maximum opening angle by the thrust of the spring and the cooperation of the third cam structure and the fixed cam; after the critical angle, there is a slot of the first cam structure and an insertion portion of the first cam that are interposed between each other and allow the first cam to rotate by a certain angle between the first cam and the first cam structure, and the certain angle is the difference between the maximum opening angle of first rotating bracket and the critical angle; when the first rotating bracket is opened to exceed the critical angle and continue to rotate, the slide cam slides towards the first cam driven by the second cam, and the insertion portion falls into the slot; during the rotation of the first rotating bracket from the critical angle to the closing, the first cam drives the slide cam to slide towards the second cam during the rotation, and with the cooperation of the fourth cam structure and the second cam structure, and the cooperation of the third cam structure and the fixed cam, the second cam rotates to the critical angle towards the closing direction at a speed faster than the first rotating bracket, and slides away from the first cam to compress the spring; after rotating to the a critical angle during the closing process, the second rotating bracket is automatically rotated to the closing and push the second cam to slide towards the first cam by the thrust of spring and the cooperation between the third cam structure and the fixed cam or between the fourth cam structure and the second cam structure.

9. The hinge for a rotating part according to claim 8, wherein corresponding to the maximum rotation angle of the second rotating bracket, the cooperation of the third cam structure and the fixed cam is a cooperation of a concave slot of the fixed cam and a bump of the third cam structure.

10. A mobile terminal, comprising a first body and a second body that are rotatably coupled, wherein the mobile terminal is further provided with the hinge of claim 1, wherein the rotating shaft is connected to the first body, and the second body is connected to the first rotating bracket.

* * * * *